(12) United States Patent
Thor et al.

(10) Patent No.: US 11,174,991 B2
(45) Date of Patent: Nov. 16, 2021

(54) CRYOGENIC FLUID DISPENSING SYSTEM HAVING A CHILLING RESERVOIR

(71) Applicant: Chart Inc., Ball Ground, GA (US)

(72) Inventors: Eric Thor, Arden Hills, MN (US); Thomas Drube, Lakeville, MN (US); Paul Drube, Lakeville, MN (US)

(73) Assignee: Chart Inc., Ball Ground, GA (US)

( * ) Notice: Subject to any disclaimer, the term of this patent is extended or adjusted under 35 U.S.C. 154(b) by 395 days.

(21) Appl. No.: 16/395,758

(22) Filed: Apr. 26, 2019

(65) Prior Publication Data

US 2019/0331298 A1    Oct. 31, 2019

Related U.S. Application Data

(60) Provisional application No. 62/662,984, filed on Apr. 26, 2018.

(51) Int. Cl.
*F17C 5/02* (2006.01)
*F17C 6/00* (2006.01)

(52) U.S. Cl.
CPC .............. *F17C 5/02* (2013.01); *F17C 6/00* (2013.01); *F17C 2205/0323* (2013.01);
(Continued)

(58) Field of Classification Search
CPC ........ F17C 5/02; F17C 6/00; F17C 2225/161; F17C 2227/0135; F17C 2250/043;
(Continued)

(56) References Cited

U.S. PATENT DOCUMENTS 4,646,525 A * 3/1987 Delacour .................. F17C 9/00
   62/47.1
5,121,609 A * 6/1992 Cieslukowski ........... F17C 7/02
   123/525

(Continued)

FOREIGN PATENT DOCUMENTS

JP    H10252996 A    9/1998

OTHER PUBLICATIONS

International Search Report and Written Opinion of the International Searching Authority for PCT Application No. PCT/US2019/029388, dated Jul. 17, 2019 (17 pages).

*Primary Examiner* — Timothy L Maust
*Assistant Examiner* — James R Hakomaki
(74) *Attorney, Agent, or Firm* — Cook Alex Ltd.; R. Blake Johnston

(57) ABSTRACT

A system for dispensing a cryogenic fluid includes a bulk storage tank configured to contain a supply of the cryogenic fluid. A heat exchanger coil is positioned in the headspace of at least one intermediate fluid tank, which contains an intermediate fluid, and is configured to receive and warm a cryogenic fluid from the bulk storage tank via heat exchange with intermediate fluid vapor in the headspace. A buffer tank receives fluid from the heat exchanger coil. A chiller coil is positioned within the intermediate fluid tank and is submerged within intermediate fluid liquid contained within the at least one intermediate fluid tank. The chiller coil receives fluid from the buffer tank and cools it via heat exchange with intermediate fluid liquid within which the chiller coil is submerged for dispensing.

22 Claims, 9 Drawing Sheets

(52) U.S. Cl.
CPC ............... *F17C 2225/0161* (2013.01); *F17C 2227/0135* (2013.01); *F17C 2250/043* (2013.01); *F17C 2265/061* (2013.01); *F17C 2265/063* (2013.01); *F17C 2265/065* (2013.01)

(58) Field of Classification Search
CPC .......... F17C 2265/061; F17C 2265/063; F17C 2265/065; F17C 2205/0323
USPC ......................................................... 62/50.1
See application file for complete search history.

(56) References Cited

U.S. PATENT DOCUMENTS

| | | | | |
|---|---|---|---|---|
| 5,373,701 | A * | 12/1994 | Siefering | F17C 9/02 62/48.1 |
| 6,029,473 | A * | 2/2000 | Bravais | F17C 5/007 62/606 |
| 6,631,615 | B2 * | 10/2003 | Drube | F17C 9/00 62/50.4 |
| 7,131,278 | B2 * | 11/2006 | Svensson | F17C 5/02 62/50.1 |
| 10,088,108 | B2 * | 10/2018 | Jansson | F17C 5/02 |
| 2002/0157402 | A1 * | 10/2002 | Drube | F17C 5/02 62/50.1 |
| 2007/0214830 | A1 * | 9/2007 | Arnold | F17C 11/005 62/607 |
| 2014/0157796 | A1 * | 6/2014 | Drube | F17C 7/02 62/49.1 |
| 2015/0204485 | A1 | 7/2015 | Varrassi | |
| 2017/0254479 | A1 * | 9/2017 | Petersen | F17C 5/00 |

* cited by examiner

CRYOGENIC FLUID DISPENSING SYSTEM HAVING A CHILLING RESERVOIR

CLAIM OF PRIORITY

This application claims the benefit of U.S. Provisional Application No. 62/662,984, filed Apr. 26, 2018, the contents of which are hereby incorporated by reference.

FIELD OF THE INVENTION

The present disclosure relates generally to cryogenic fluid dispensing systems and, in particular, to a cryogenic fluid dispensing system having a chilling reservoir for cooling the cryogenic fluid prior to dispensing.

BACKGROUND

Systems for dispensing cryogenic fluids are used in a variety of applications. Due to the increasing interest in alternative vehicle fuels, hydrogen fuel stations, for fueling fuel cell electric vehicles, are growing in popularity. There are both compressor driven and pump driven hydrogen fuel stations. In a typical compressor style fuel station, the hydrogen is sent from either a liquid tank or a gaseous tank to a 15,000 psig buffer storage tank via a compressor. In a typical pump style fuel station, liquid hydrogen is sent to a vaporizer and then on to the 15,000 psig buffer storage tank via a positive displacement pump.

A hydrogen liquid storage tank serves as the primary container for either type of fuel station. The advantage of the compressor style fuel station is that cryogenic vapor is pulled from the top of the storage vessel. This removes more heat from the system than pumping liquid from the bottom of the storage container. Thus the compressor solution is better in terms of heat management. The disadvantage of the compressor style fuel station is that compressors are notorious for needing repair and are also more energy consumptive that pumps. This is because it is easier to move a given mass flowrate of liquid via pumping than the same mass flowrate of gas via a compressor. Positive displacement pumps can also need repair, but often that maintenance can be managed via replacement of O-rings or other easily replaceable components.

The compressor style fuel station will warm the hydrogen gas prior to entering the compressor. The positive displacement pump style fuel station will vaporize and warm the hydrogen after the pump.

In either application, hydrogen gas is stored in a high pressure buffer tank(s) which are at ambient temperature. A common practice is to cool the hydrogen between the buffer tank(s) and the dispenser. This ensures more mass is stored in the vehicle fuel tank than can otherwise be accommodated by ambient temperature hydrogen at 10,000 psi. Hence the hydrogen gas is cooled to −40 degrees Fahrenheit before entering the vehicle fuel tank.

In the case of the compressor style fuel station, the hydrogen gas is typically cooled between the buffer tank(s) and the dispenser via chillers, where coolant is pumped or otherwise supplied to the chillers.

In the case of the pump style fuel station, the hydrogen gas is typically cooled between the buffer tank(s) and the dispenser by mixing liquid hydrogen with the warm buffer tank hydrogen gas. If there is a backlog of vehicles being fueled one after the other, this is not an issue. In this case the pump is running pretty much non-stop and the ability to mix is available. However, during off peak hours, the fueling of vehicles is not continuous. If the buffer tank is large enough to accommodate fueling of a few vehicles without running the pump, then it would be desirable to avoid starting the pump for every vehicle. Start stop cycles are a significant contributor to pump seal degradation.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a system for dispensing a cryogenic fluid includes a bulk storage tank configured to contain a supply of the cryogenic fluid and at least one intermediate fluid tank configured to contain an intermediate fluid liquid with a headspace defined there above containing an intermediate fluid vapor. A heat exchanger coil is positioned in the headspace of the at least one intermediate fluid tank and is configured to receive and to warm the cryogenic fluid from the bulk storage tank via heat exchange with intermediate fluid vapor in the headspace. A buffer tank is configured to receive fluid from the heat exchanger coil. A chiller coil is positioned within the at least one intermediate fluid tank and is configured to be submerged within intermediate fluid liquid contained within the at least one intermediate fluid tank, receive fluid from the buffer tank, and cool fluid received from the buffer tank via heat exchange with intermediate fluid liquid within which the chiller coil is submerged. The chiller coil includes an outlet configured to dispense fluid from the chiller coil.

In another aspect, a system for dispensing a cryogenic fluid includes a bulk storage tank containing a supply of the cryogenic fluid and at least one intermediate fluid tank containing an intermediate fluid liquid with a headspace defined there above containing an intermediate fluid vapor. A heat exchanger coil is positioned in the headspace of the at least one intermediate fluid tank and is configured to receive and to warm the cryogenic fluid from the bulk storage tank via heat exchange with the intermediate fluid vapor in the headspace. A buffer tank is configured to receive fluid from the heat exchanger coil, and a chiller coil is submerged within the intermediate fluid liquid and configured to receive fluid from the buffer tank and cool fluid received from the buffer tank via heat exchange with the intermediate fluid liquid within which the chiller coil is submerged. The chiller coil includes an outlet configured to dispense fluid from the chiller coil.

In still another aspect, a method for dispensing a cryogenic fluid includes the steps of storing the cryogenic fluid in a bulk storage tank, storing an intermediate fluid in at least one intermediate fluid storage tank as an intermediate fluid liquid with an intermediate fluid vapor above, warming cryogenic fluid from the bulk storage tank via heat exchange with the intermediate fluid vapor so that the intermediate fluid vapor is condensed, storing the warmed fluid in a buffer tank, cooling fluid from the buffer tank via heat exchange with the intermediate fluid liquid and dispensing the cooled fluid.

DETAILED DESCRIPTION OF EMBODIMENTS

In a number of embodiments of the present invention, described in greater detail below, a chilling reservoir or tank containing an intermediate fluid is provided. This component replaces the warm hydrogen gas and cold hydrogen mixing component of the pump style fuel station described above. In such a system, hydrogen being vaporized as it travels from a bulk storage tank cools the intermediate fluid whereas the warm hydrogen traveling from a buffer tank is cooled by the intermediate fluid in the chilling reservoir. In other words, the system uses the intermediate fluid in the chilling reservoir to chill hydrogen gas from an ambient temperature buffer tank before is it sent to a dispenser. The intermediate fluid is cooled by cryogenic hydrogen before the warmed hydrogen is sent to the ambient temperature high pressure buffer tank. As a result, the intermediate fluid acts as a heat battery or heat sink.

While embodiments of the disclosure are described below as dispensing hydrogen, the technology of the disclosure may be used to dispense other cryogenic fluids. As used herein, the terms "cryogenic fluid", "cryogenic liquid" or "cryogen" are defined as meaning a fluid having a normal boiling point below −130° F. (−90° C.).

While carbon dioxide is useful as an intermediate fluid due to the high thermal mass and phase change attributes, and is described as the intermediate fluid in the embodiments presented below, alternative compressible intermediate fluids may be used. Examples of alternative fluids include, but are not limited to, neon, propane, ethane, ethylene and carbon monoxide.

In embodiments where the cryogenic fluid is hydrogen, the carbon dioxide chilling reservoir is provided with regulators and pressure builders to ensure it remains close to −40 degrees Fahrenheit.

If carbon dioxide is used as the intermediate fluid, care must be used in the system design to avoid freezing. The −40 degrees Fahrenheit temperature noted above is above the freeze solid temperature of −109 degrees Fahrenheit for carbon dioxide at ambient pressure. This makes the carbon dioxide temperature controllable by carbon dioxide storage tank pressure regulation.

Figure 1:
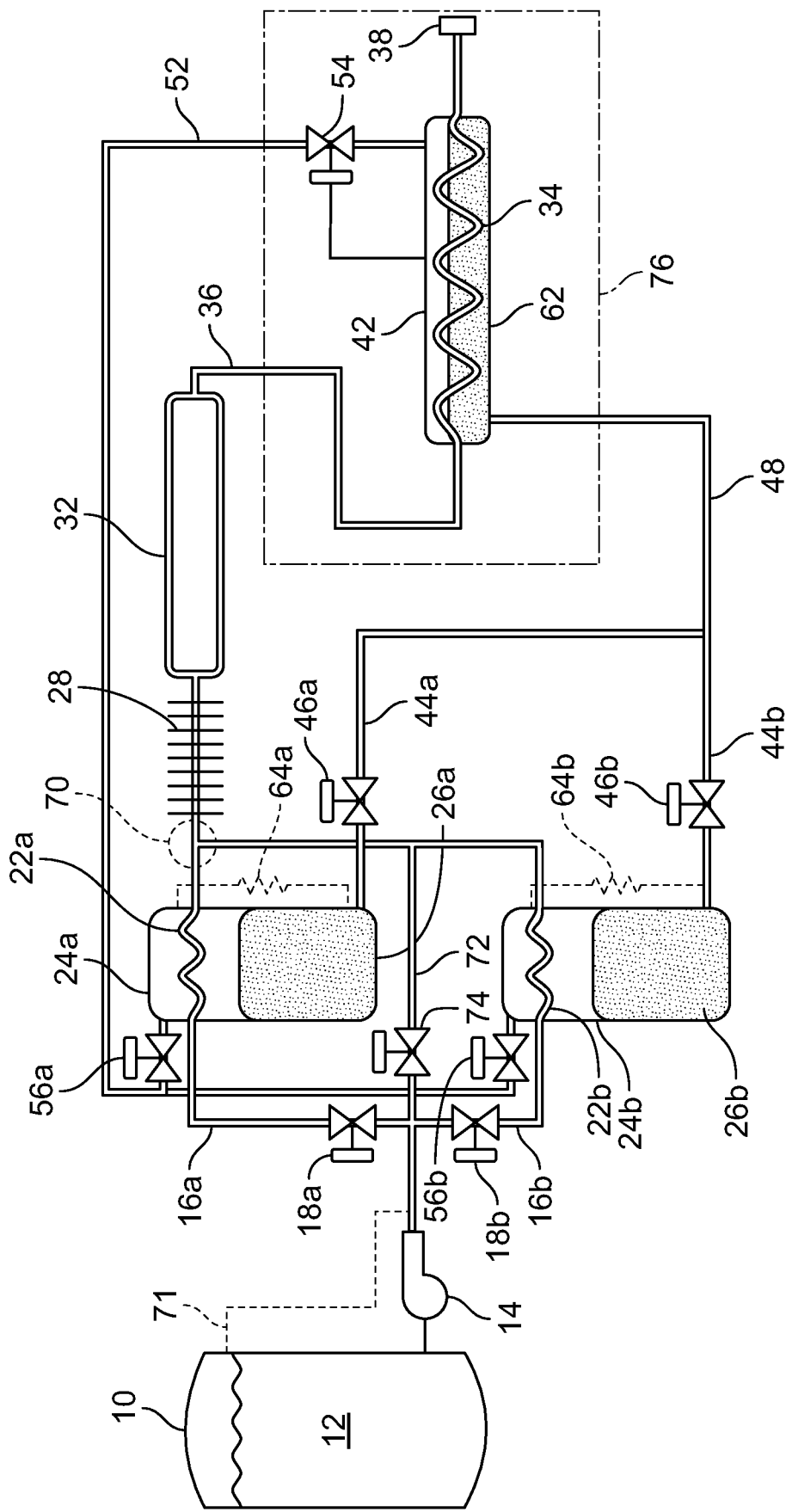
FIG. 1 is a schematic diagram of a first embodiment of the cryogenic fluid dispensing system of the disclosure.

A first embodiment of the system of the disclosure is presented in FIG. 1. A bulk storage tank 10, which is preferably jacketed, contains a supply of liquid hydrogen 12. A pump 14 has an inlet in fluid communication with the bulk tank 10 and an outlet connected to line 16a, which is provided with valve 18a. Line 16a leads to a heat exchanger coil 22a which is positioned within the headspace of an intermediate fluid storage tank 24a. The headspace is formed in tank 24a above an intermediate fluid 26a, which may be carbon dioxide. The outlet of the coil 22a is in fluid communication with the inlet of a heat exchanger 28, which may be an ambient heat exchanger. The outlet of the heat exchanger 28 is in fluid communication with buffer tank 32. While a single buffer tank 32 is shown, the system may include multiple buffer tanks. The outlet of the buffer tank is in fluid communication with the inlet of a chiller coil 34 via line 36. The outlet of the chiller coil 34 is connected to a dispenser 38 which may be, as an example only, a nozzle and/or a dispensing valve, and may or may not include a mass flow meter, for refueling a vehicle.

The outlet of pump 14 is also outlet connected to line 16b, which is provided with valve 18b. Line 16b leads to a heat exchanger coil 22b which is positioned within the headspace of an intermediate fluid storage tank 24b. The headspace is formed in tank 24b above an intermediate fluid 26b, which may be carbon dioxide. The outlet of the coil 22b is in fluid communication with the inlet of a heat exchanger 28.

The liquid sides of intermediate fluid storage tanks 24a and 24b are selectively in fluid communication with a chilling reservoir or tank 42, within which chiller coil 34 is positioned. As an example only, the chilling reservoir 42 and chiller coil 34 may take the form of a shell and tube heat exchanger. More specifically, line 44a, which is equipped with valve 46a, leads from the liquid side of tank 24a to line 48, which leads to the chilling reservoir 42. Line 44b, which is equipped with valve 46b, leads from the liquid side of tank 24b to line 48.

A venting line 52, which is provided with vent control valve 54, leads from the headspace of the chilling reservoir 42 to valves 56a and 56b, which selectively communicate with the headspaces of tanks 24a and 24b, respectively.

In view of the above, the system of FIG. 1 provides two identical sister intermediate fluid (carbon dioxide in the illustrated embodiment) tanks—tank 24a and tank 24b. Liquid carbon dioxide may be moved from tank 24a to tank 24b by way of chilling reservoir 42 or from tank 24b to tank 24a by way of chilling reservoir 42, as will be explained below.

In embodiments where hydrogen is used as the dispensed fluid, all tanks and piping that handle the hydrogen should be stainless steel. When carbon dioxide is used as the intermediate fluid, handling components should also be made of stainless steel.

As an example of operation of the system of FIG. 1, assume that valve 18a is initially open and valve 18b is initially closed. As a result, activation of pump 14 causes liquid hydrogen to travel to coil 22a, where it is warmed by carbon dioxide vapor in the headspace of tank 24a to near the temperature of the intermediate fluid. The warmed hydrogen then travels through ambient heat exchanger 28, where it is warmed to near ambient temperature. The resulting hydrogen gas then travels to the buffer tank 32 where it is stored, as an example only, at 10,000-15,000 psig at ambient temperature. When the dispenser 38 is activated, such as during fueling of a vehicle, hydrogen gas from buffer tank 32 flows through chiller coil 34 of the chilling reservoir 42, where it is cooled by liquid carbon dioxide 62 contained within the chilling reservoir 42. The cooled hydrogen fluid is then dispensed to the vehicle. The hydrogen fuel ideally, but as an example only, equilibrates at −40° F. in the chilling reservoir.

Tanks 24a and 24b may be operated to provide liquid carbon dioxide to reservoir 42. Continuing with the example of operation presented above, valve 46b is initially opened while valve 46a is initially closed. As an example only, tank 24*b* is controlled to be at 130 psig, which corresponds to a saturation temperature of −40° F. for carbon dioxide. Tank 24*b* may optionally be provided with a pressure building circuit, indicated in phantom at 64*b*, where intermediate fluid liquid is vaporized in a heat exchanger and directed to the headspace of tank 24*b*, to accomplish this (tank 24*a* may optionally be provided with a similar pressure building circuit, indicated in phantom at 64*a*). It should be noted that horizontal intermediate fluid tanks may be desirable in some applications to achieve a better saturated condition for the tanks 24*a* and 24*b*. Continuing with the operation example, tank 24*a* is controlled to be at 120 psig or less.

The pressure differential between tanks 24*a* and 24*b* drives the liquid carbon dioxide from tank 24*b* to chilling reservoir 42. As hydrogen flows through chiller coil 34 and is cooled, the liquid carbon dioxide 62 within the chilling reservoir 42 is vaporized and permitted to flow out of the headspace of the chilling reservoir 42 via line 52 under the control of valve 54. As a result, the system uses a phase change of the intermediate fluid in the chilling reservoir to achieve the desired temperature of the hydrogen fuel.

The level of the liquid carbon dioxide 62 in the chilling reservoir 42 is controlled (such as through use of valve 54) to ensure that the chiller coil 34 is sufficiently covered to provide cooling of the hydrogen fuel flowing there through.

In the example of operation presented thus far, valve 56*a* is open while valve 56*b* is closed. As a result, the warm carbon dioxide vapor traveling through line 52 enters the headspace of tank 24*a*. As noted above, however, liquid hydrogen traveling through coil 22*a* cools the headspace so that carbon dioxide vapor in the headspace of tank 24*a* is condensed and the pressure head collapsed.

As time goes on, a mass of carbon dioxide will be leaving tank 24*b* and accumulating in tank 24*a*. When the carbon dioxide supply within tank 24*b* approaches a level where the desired liquid level within chilling reservoir 42 cannot be maintained, the system needs to be reconfigured so that tank 24*a* becomes the carbon dioxide source tank and tank 24*b* becomes the carbon dioxide receiving tank. In order to do so, tank 24*a* must be pressurized (for example) to 130 psig, while tank 24*b* must be depressurized (for example) to 120 psig or less. This may be accomplished in a number of different ways. For example, optional pressure building circuit 64*a* may be used to build pressure within tank 24*a*, while tank 24*b* may be vented. Alternatively, the pressures in tanks 24*a* and 24*b* may be equalized (such as by temporarily placing their headspaces in fluid communication with one another) and then the pressure building circuit 64*a* used to build the pressure in tank 24*a*, while hydrogen flowing through coil 22*b* is used to reduce the pressure in tank 24*b*. As an alternative to venting tank 24*b* or using coil 22*b*, the pressure therein may be allowed to drop as the last portion of liquid carbon dioxide is transferred to chilling reservoir 42.

As a result, tank 24*a* will become the 130 psig carbon dioxide source tank and tank 24*b* will be the liquid carbon dioxide receiving tank, and valve 44*a* must be opened and valve 44*b* closed. In addition, valve 18*a* will need to be closed while valve 18*b* is opened, to direct liquid hydrogen through coil 22*b* (instead of through coil 22*a*), and valve 56*a* will need to be closed and valve 56*b* opened, to return carbon dioxide vapor to the headspace of tank 24*b* instead of tank 24*a*.

In an alternative embodiment of the system of FIG. 1, the pump 14 may be eliminated and a compressor, indicated in phantom at 70, may be added. In addition, line 16*a* and 16*b* are selectively (via valves 18*a* and 18*b*) placed in fluid communication with the headspace of bulk liquid hydrogen supply tank 10 via line 71. In such a system, the compressor 70 is activated to pull hydrogen vapor from the headspace of tank 10 through coils 22*a* or 22*b* (so that the hydrogen is warmed before the compressor 70), and directed through heat exchanger 28, to fill buffer tank 32.

The system of FIG. 1 also includes a bypass line 72 and a bypass valve 74. The bypass valve 74 may be opened and adjusted so that only a portion of liquid hydrogen from pump 14 is directed through the coils 22*a* or 22*b*, depending on whether valve 18*a* is opened and valve 18*b* is shut, or valve 18*b* is opened and valve 18*a* is shut. The liquid hydrogen exiting bypass line 72 rejoins the warmed hydrogen from coils 22*a* or 22*b* prior to entry of the resulting stream into heat exchanger 28. As a result, liquid hydrogen may be selectively directed through either coil 22*a* or 22*b* as required to maintain a sufficiently low pressure to drive flow.

With reference to FIG. 1, the components of the system within box 76 (chilling reservoir 42 and chilling coil 34) may be located remotely from the remaining components of the system. This makes the system of FIG. 1 well suited for use in a vehicle refueling station as the relatively compact chilling reservoir (and chiller coil) and dispenser may be the sole components of the station located on a fueling island. At least the lines carrying liquid carbon dioxide or another intermediate fluid to the island components would need to be jacketed or otherwise insulated in such an installation.

Figure 2:
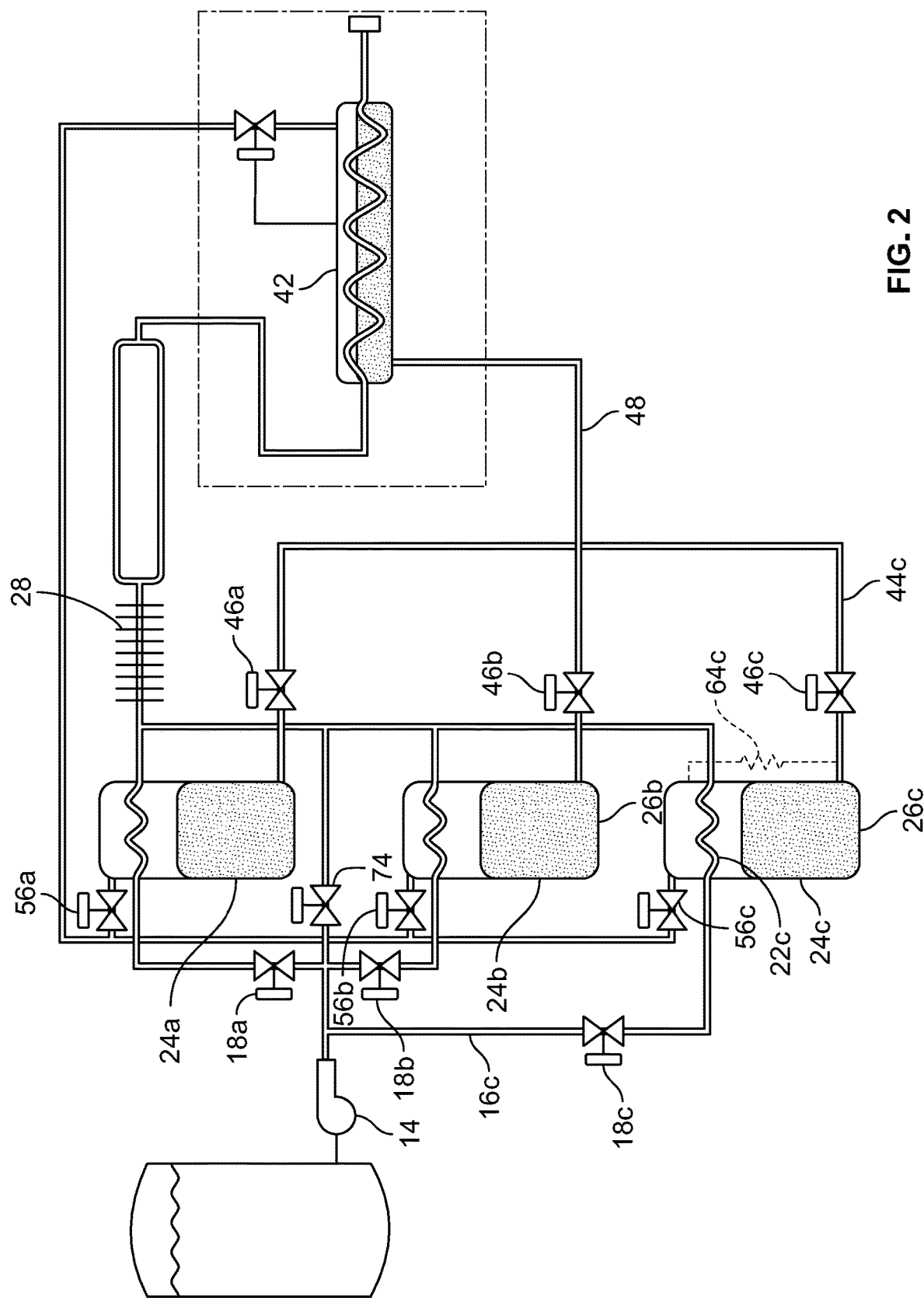
FIG. 2 is a schematic diagram of a second embodiment of the cryogenic fluid dispensing system of the disclosure.

In a second embodiment of the system, illustrated in FIG. 2, a third intermediate fluid tank 24*c* has been added to the embodiment of FIG. 1. More specifically, the outlet of pump 14 is also connected to line 16*c*, which is provided with valve 18*c*. Line 16*c* leads to a heat exchanger coil 22*c* which is positioned within the headspace of an intermediate fluid storage tank 24*c*. The headspace is formed in tank 24*c* above an intermediate fluid 26*c*, which may be carbon dioxide. The outlet of the coil 22*c* is in fluid communication with the inlet of heat exchanger 28. An additional line that includes valve 56*c* selectively places the headspace of tank 26*c* in fluid communication with the headspace of chilling reservoir 42. In addition, carbon dioxide tank 26*c* is selectively in fluid communication with chilling reservoir 42 via line 44*c* (having valve 46*c*) and line 48. Otherwise, the system of FIG. 2 is identical to the system of FIG. 1.

The third tank 24*c* of FIG. 2 provides an extra supply of intermediate fluid (carbon dioxide, for example) where the timing of switching between tanks 24*a* and 24*b* as the carbon dioxide source and receiving tanks is critical. For example, during operation of the system where tank 24*b* is the carbon dioxide source tank (at 130 psig) and tank 24*a* is the carbon dioxide vapor receiving tank, tank 24*c* contains an additional supply of carbon dioxide 26*c* at a pressure (for example) of 130 psig, and valves 18*c*, 46*c* and 56*c* are maintained in the closed configuration. An optional pressure building circuit 64*c* may be necessary to pressurize the tank 24*c* to 130 psig or other desired pressure.

When the supply of liquid carbon dioxide 26*b* in tank 24*b* drops to the level where tank 24*b* should be switched over to serve as the receiving tank, valve 46*b* is closed and valve 46*c* is opened (valve 46*a* remains closed). In addition, valve 56*b* is opened and valve 56*a* is closed, while valve 18*b* is opened and valve 18*a* is closed. The pressure within tank 24*b* may be reduced to (for example) 120 psig or lower using, for example, one or more of the methods described above. Liquid carbon dioxide, however, may be immediately supplied to the chilling reservoir 42 from tank 24*c* since tank 24*c* was already filled with liquid carbon dioxide at the correct pressure of (for example) 130 psig. There is no need to wait for tank 24c to be pressurized to 130 psig.

Figure 3:
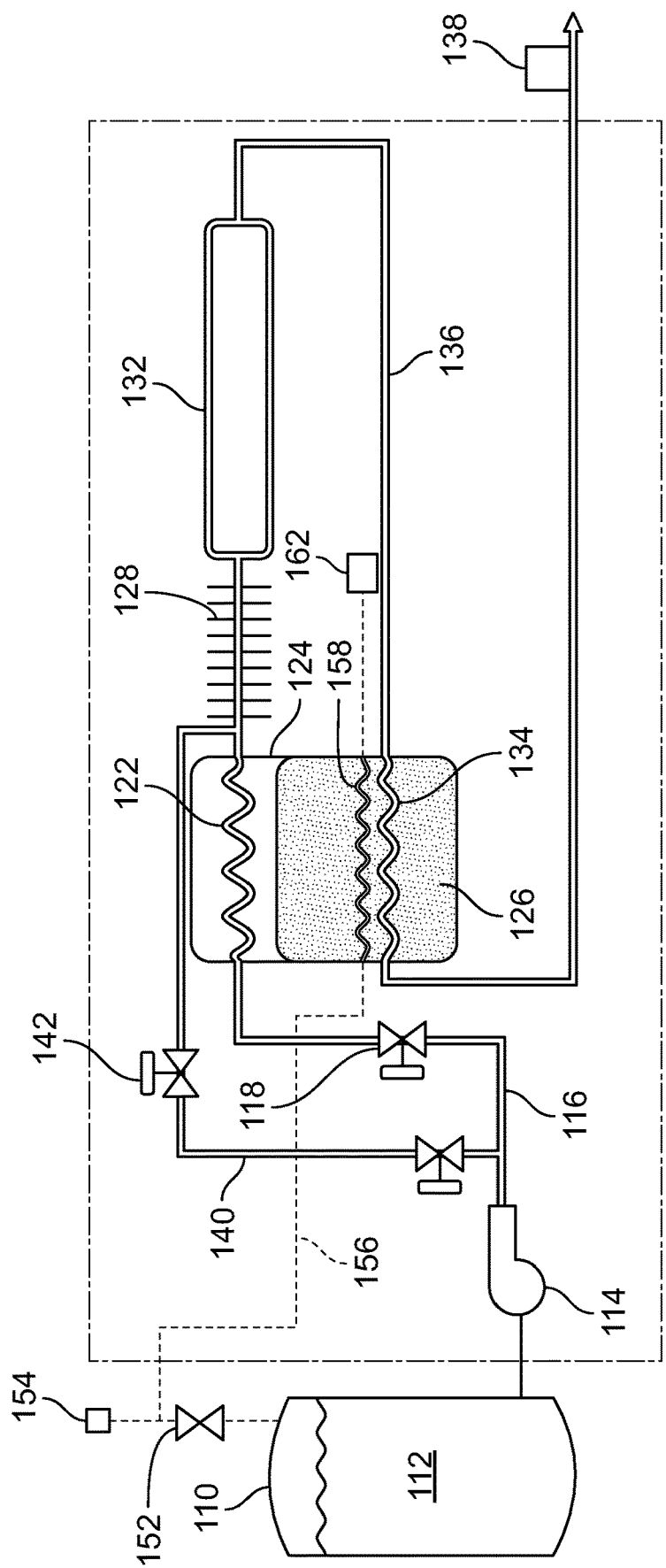
FIG. 3 is a schematic diagram of a third embodiment of the cryogenic fluid dispensing system of the disclosure.

Turning to FIG. 3, an embodiment of the system that uses a single intermediate fluid tank 124 is disclosed. A bulk storage tank 110, which is preferably jacketed, contains a supply of liquid hydrogen 112. A pump 114 has an inlet in fluid communication with the bulk tank 110 and an outlet connected to line 116, which is provided with valve 118. Line 116 leads to a heat exchanger coil 122 which is positioned within the headspace of the intermediate fluid storage tank 124. The headspace is formed in tank 124 above an intermediate fluid 126, which may be carbon dioxide. The outlet of the coil 122 is in fluid communication with the inlet of a heat exchanger 128, which may be an ambient heat exchanger. The outlet of the heat exchanger 128 is in fluid communication with buffer tank 132. While a single buffer tank 132 is shown, the system may include multiple buffer tanks. The outlet of the buffer tank is in fluid communication with the inlet of a chiller coil 134 via line 136. In this embodiment, the chiller coil is positioned within the intermediate fluid tank 124 so that the intermediate fluid tank also serves as the chilling reservoir. The outlet of the chiller coil 134 is connected to a dispenser 138 which may be, as an example only, a nozzle and/or a dispensing valve and/or a mass flow meter for refueling a vehicle. A bypass line 140 is provided with a bypass valve 142 and extends between the outlet of pump 114 and the inlet of heat exchanger 128.

As an example of operation of the system of FIG. 3, valves 118 and 142 may be adjusted to control the flow rate of liquid hydrogen through the coil 122 and the rest of the system when the pump 114 is activated. The warmed hydrogen exiting coil 122 travels through ambient heat exchanger 128, where it is warmed to near ambient temperature. The resulting fluid then travels to the buffer tank(s) 132 where it is stored, as an example only, at 10,000-15,000 psig at ambient temperature. When the dispenser 138 is activated, such as during fueling of a vehicle, hydrogen gas from buffer tank 132 flows through chiller coil 134, where it is cooled by liquid carbon dioxide 126 contained within the tank 124. The cooled hydrogen fluid is then dispensed to the vehicle. The hydrogen fuel ideally, but as an example only, equilibrates at −40° F. in the chiller coil 134. The heat added to the carbon dioxide 126 via cooling of the hydrogen gas stream flowing through line 136 is countered by the cooling and condensation of the carbon dioxide vapor in the headspace of the tank 124 by coil 122. The amount of liquid hydrogen directed through coil 122 (via the setting of valve 118) is selected to maintain the pressure in tank 124 at approximately 130 psig (for example).

Figure 4A:
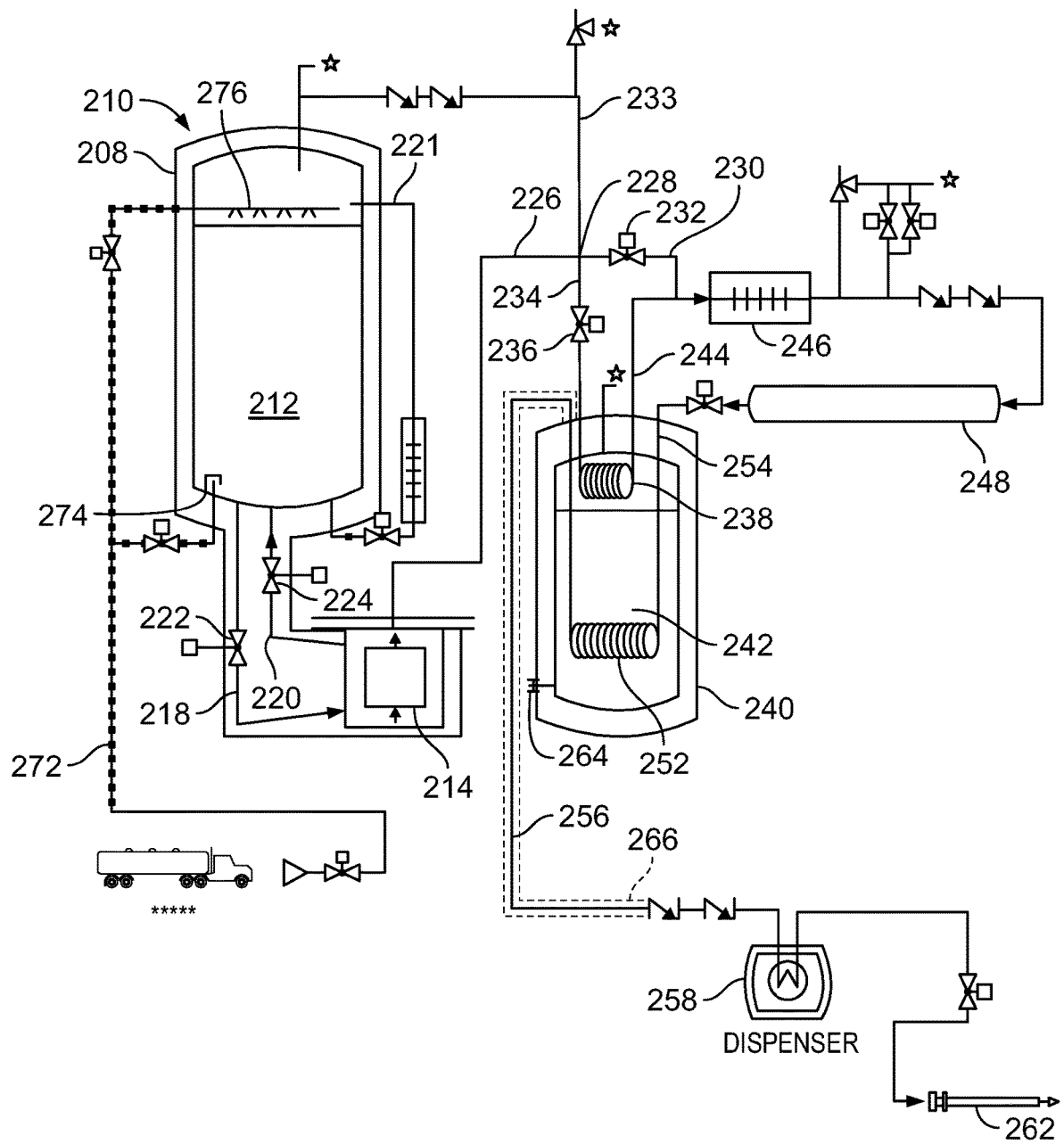
FIG. 4A is a schematic diagram of a fourth embodiment of the cryogenic fluid dispensing system of the disclosure
Figure 4B:
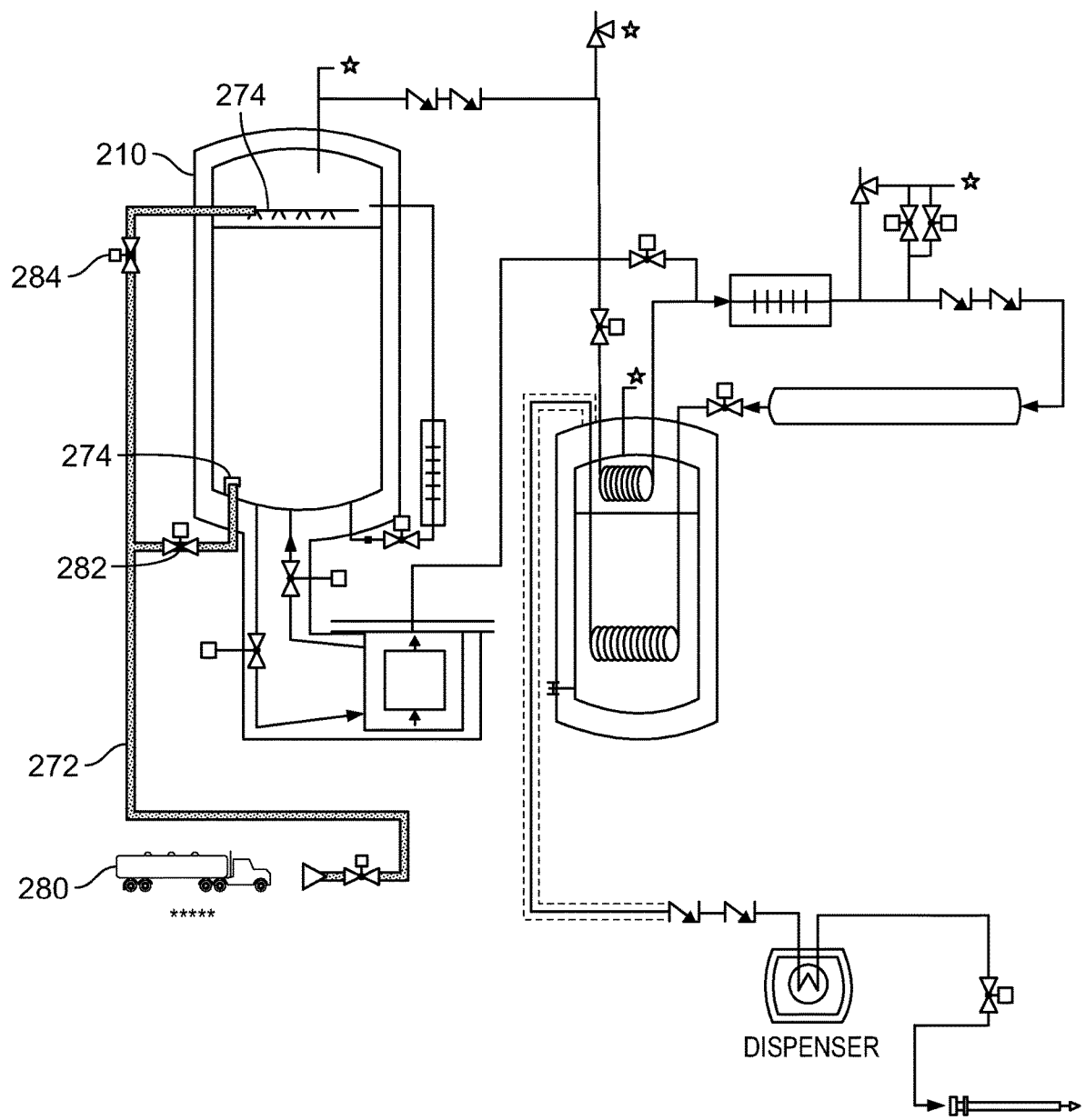
FIG. 4B is a schematic diagram of the system of FIG. 4A illustrating refill of the bulk tank.

Another alternative embodiment of the disclosure is presented in FIGS. 4A-4E. As illustrated in FIG. 4A, a bulk storage tank, indicated in general at 210 and which is preferably jacketed via jacket 208, contains a supply of liquid hydrogen 212. A pump 214 is positioned within a sump 216, which is preferably also positioned within the jacket 208. The sump 216 has an inlet in fluid communication with the bulk tank 210 so that it receives liquid from the bulk tank 210 via line 218. A return line 220 leads from the top portion of the sump to the bulk tank. Bulk tank 210 is provided with a pressure building circuit 221.

The liquid level within the jacket is maintained so that the pump is submerged within the cryogenic liquid and cooldown of the pump is unnecessary when pumping commences. This also contributes to the reliability of the pump because heat cycles on the pump are reduced (since the pump is kept cold nearly all of the time). In addition, lines 218 and 220 are provided with valves 222 and 224, which permit maintenance on, or removal of, the pump without taking bulk tank 210 out of service.

The outlet of the pump 214 is in fluid communication with line 226, which leads to junction 228. A bypass line 230 exits junction 228 and is provided with a bypass valve 232. A vent line 233 exits the headspace of bulk thank 210 and leads to junction 228. In addition, a line 234 is provided with valve 236 and leads from the junction to a heat exchanger coil 238 which is positioned within the headspace of the intermediate fluid storage tank 240. The headspace is formed in tank 240 above an intermediate fluid 242, which may be carbon dioxide.

The outlet of the coil 238 is in fluid communication via line 244 with the outlet of bypass line 230 and the inlet of a heat exchanger 246, which may be an ambient heat exchanger. The outlet of the heat exchanger 246 is in fluid communication with buffer tank 248. While a single buffer tank is shown, the system may include multiple buffer tanks.

The outlet of the buffer tank is in fluid communication with the inlet of a chiller coil 252 via line 254. In this embodiment, the chiller coil is positioned within the intermediate fluid tank 240 so that the intermediate fluid tank also serves as the chilling reservoir. The outlet of the chiller coil 252 is connected via line 256 to a dispenser 258 for refueling a vehicle via a nozzle 262.

Line 256 is preferably jacketed via jacket 266. The annular space between the jacket 266 and line 256 is connected to the liquid side of tank 240 via liquid line 264. As a result, intermediate fluid 242 fills the annular space within jacket 266 to keep the liquid hydrogen flowing through line 256 cool as it flows to the dispenser. This is particularly useful if the dispenser 258 is on a fueling island remote from the tank 240 so that line 256 must traverse a greater distance. The annular space within the jacket 266 is also in fluid communication with the headspace of tank 240 so that vaporized carbon dioxide may return to the tank.

The bulk tank 210 is provided with a fill line 272 that is in fluid communication with a bottom fill opening 274 and a spray bar 276. During refill of the bulk tank, with reference to FIG. 4B, a tanker truck 280 containing liquid hydrogen is connected to line 272. The liquid flows through line 272 and into the tank via bottom fill opening 274. Depending on the setting of valves 282 and 284, a portion of the liquid hydrogen is directed to spray bar 276 to collapse the vapor pressure within the headspace of tank 210.

Figure 4C:
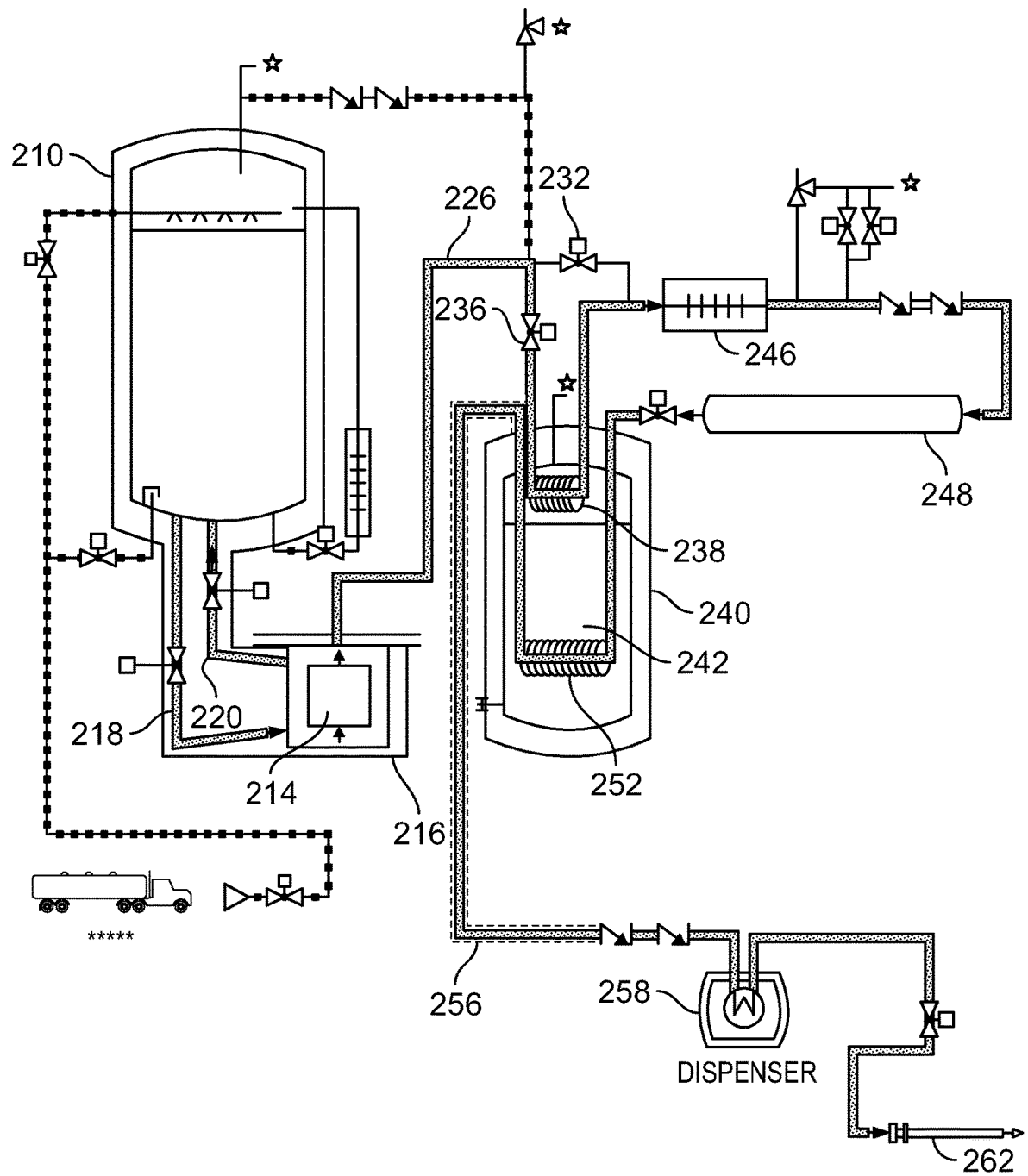
FIG. 4C is a schematic diagram of the system of FIG. 4A illustrating a dispensing operation.

An example of operation of the system during dispensing is illustrated in FIG. 4C. Liquid hydrogen flows from tank 210 through line 218 to sump 216. Liquid returns to the sump 216 through line 220 with the liquid level in the sump being maintained at a level whereby pump 214 is submerged.

Valve 232 is closed, while valve 236 is open.

Liquid exiting pump 214 travels through line 226 to heat exchanger coil 238, where it is warmed to near the temperature of the intermediate fluid 242. The warmed hydrogen exiting coil 238 travels through ambient heat exchanger 246, where it is warmed to near ambient temperature. The resulting fluid then travels to the buffer tank(s) 248 where it is stored, as an example only, at 10,000-15,000 psig at ambient temperature. Fluid from buffer tank 248 flows through chiller coil 252, where it is cooled by the liquid carbon dioxide intermediate fluid 242 contained within the tank 240. The cooled hydrogen fluid is then dispensed to the vehicle via lines 256, dispenser 258 and nozzle 262. The hydrogen fuel ideally, but as an example only, equilibrates at −40° F. in the chiller coil 252. The heat added to the carbon dioxide 242 via cooling of the hydrogen gas stream flowing through coil 252 is countered by the cooling and condensation of the carbon dioxide vapor in the headspace of the tank 240 by coil 238. The amount of liquid hydrogen directed through coil 238 (via the setting of valve 236) is selected to maintain the pressure in tank 240 at approximately 130 psig (for example).

Figure 4D:
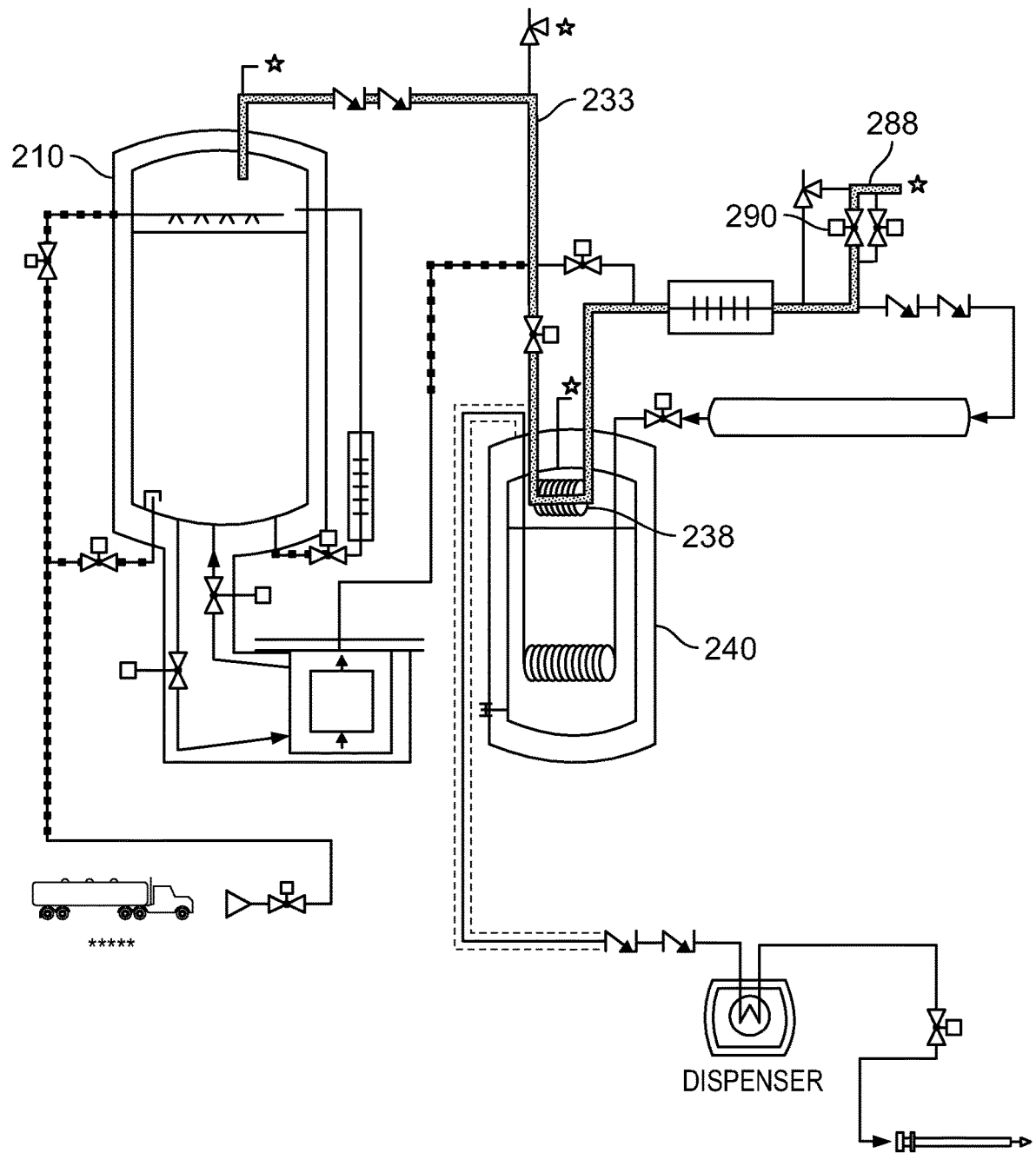
FIG. 4D is a schematic diagram of the system of FIG. 4A illustrating a venting operation.

The system may be configured as illustrated in FIG. 4D to control pressure within the intermediate fluid storage tank 240 by venting cold hydrogen gas from the headspace of tank 210 through line 233 through the coil 238 of tank 240. As a result, the vapor in the headspace of tank 240 is condensed to reduce the pressure within the tank. The warm fluid exiting the coil 238 travels through heat exchanger 246, is warmed, and then is vented to atmosphere through vent circuit 288, where valve 290 has been opened.

Figure 4E:
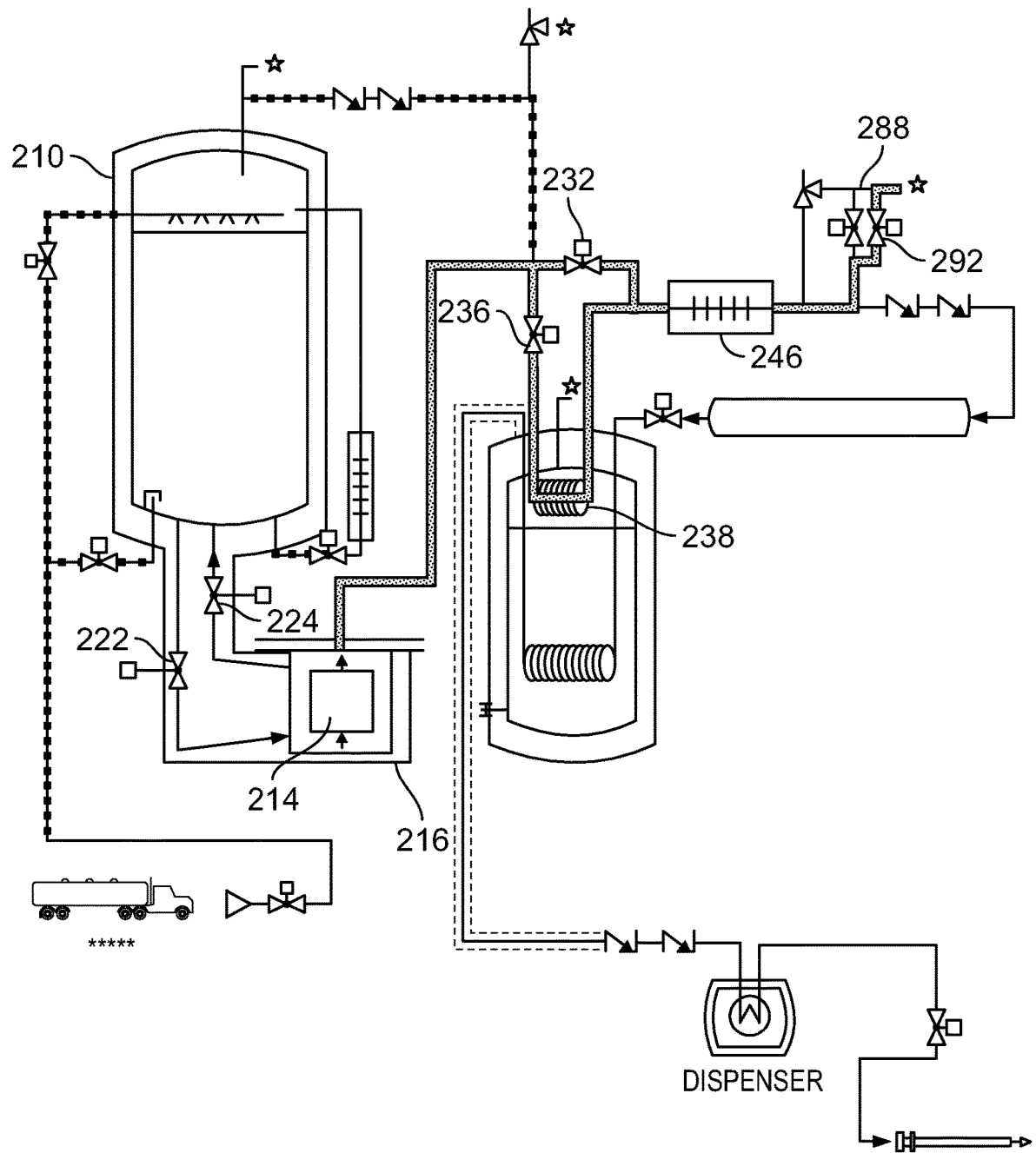
FIG. 4E is a schematic diagram of the system of FIG. 4A illustrating preparation of the system for pump servicing.

With reference to FIG. 4E, the pump 214 may be serviced by first closing valves 222 and 224 so that liquid from bulk tank 210 no longer flows to the sump 216. The sump may then be vented to relieve pressure by opening valve 232 (valve 236 remains open as well) and valve 292 of vent circuit 288. As a result, pressure from within the sump is vented through the heat exchanger 246, coil 238 and vent circuit 288. The sump 216 may then be drained and the pump 214 removed or accessed for maintenance.

Figure 5:
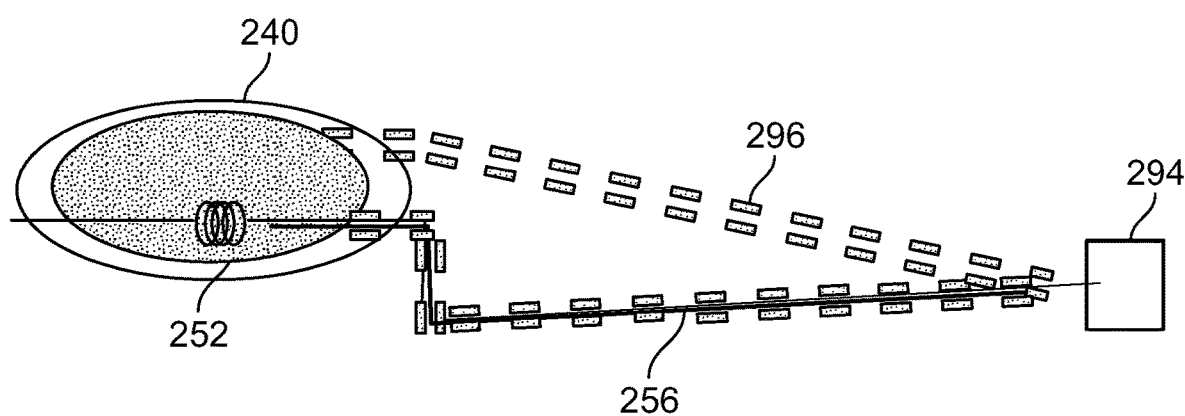
FIG. 5 is a schematic diagram of an embodiment of a chiller line.

With reference to FIG. 5, in an alternative embodiment of the system of FIG. 4A, where the dispenser 258 is positioned on a fueling island, the line 256 exiting the coil 252 is dropped to a low elevation (buried deeply within the ground, for example) immediately outside the intermediate fluid tank 240. The elevation of the line, as illustrated in FIG. 5, then gradually rises as the line approaches the island (294). As a result, any heat added to the line that would produce vapor would first go to the island 294. The resulting intermediate fluid vapor would then be returned to the tank 240 via rising insulated vapor return line 296.

The embodiments of the disclosure described above therefore use a phase change intermediate fluid to provide heat to the cold liquid hydrogen (from the storage tank to the buffer tank), and to cool the warm hydrogen gas (from the buffer tank to the vehicle). As a result, hydrogen fuel may be dispensed from a buffer storage tank or tanks and cooled prior to dispensing without activating the pump. They are therefore capable of handling multiple dispenses without the need to activate the pump. Also this system avoids the need for pumping and refrigerating brine solution, thus saving electrical consumption.

The systems of FIGS. 1-4A therefore solve the problem of having many start stop cycles for the pumped solution of hydrogen. This solution also eliminates the need for a conventional style chiller for compressor style fuel stations which have liquid hydrogen storage.

In either the pumped solution or the compressor solution, the cooling of the intermediate fluid (such as carbon dioxide) exceeds that from the warming via the hydrogen going from the buffer tank to the vehicle. Thus heat can always be added to the intermediate fluid tank to maintain the desired saturation temperature.

Embodiments of the disclosure also comply with National Fire Protection Association (NFPA) regulation 55 requirement for the heat exchanger which requires an intermediate heat transfer fluid when hydrogen is processed and/or dispensed.

In applications where the liquid hydrogen warms excessively, venting of the bulk tanks may be required. With reference to FIG. 3, boil off gases in such situations may be removed by opening vent valve 152 so that venting may occur through vent 154. Alternatively, hydrogen gas exiting valve 152 may be routed through line 156 and coil 158, which is positioned in the headspace of the chilling reservoir, to capture the cold of these boil off cryogenic hydrogen gases. Such an approach may also be used in the embodiments of FIGS. 1, 2 and 4A and in other embodiments. As yet another alternative, a miniature turbine 162 which burns hydrogen may receive the hydrogen gas exiting coil 158. Such a turbine may be used, for example, to direct drive a hydrogen compressor of the system.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A system for dispensing a cryogenic fluid comprising:
   a. a bulk storage tank configured to contain a supply of the cryogenic fluid;
   b. at least one intermediate fluid tank configured to contain an intermediate fluid liquid with a headspace defined there above containing an intermediate fluid vapor;
   c. a heat exchanger coil positioned in the headspace of the at least one intermediate fluid tank and configured to receive and to warm a cryogenic fluid from the bulk storage tank via heat exchange with intermediate fluid vapor in the headspace;
   d. a buffer tank configured to receive fluid from the heat exchanger coil; and
   e. a chiller coil positioned within the at least one intermediate fluid tank and configured to:
      i) be submerged within intermediate fluid liquid contained within the at least one intermediate fluid tank,
      ii) receive fluid from the buffer tank, and
      iii) cool fluid received from the buffer tank via heat exchange with intermediate fluid liquid within which the chiller coil is submerged, said chiller coil including an outlet configured to dispense fluid from the chiller coil.

2. The system of claim 1 wherein the intermediate fluid is carbon dioxide.

3. The system of claim 1 wherein the cryogenic fluid is hydrogen.

4. The system of claim 1 wherein the at least one intermediate fluid tank includes a first intermediate fluid storage tank, a second intermediate fluid storage tank and a chilling reservoir, wherein:
   i) the chiller coil is positioned within the chilling reservoir,
   ii) the chilling reservoir is configured to receive and vaporize intermediate fluid liquid from first intermediate fluid storage tank using the chiller coil,
   iii) the second intermediate fluid storage tank is configured to receive the intermediate fluid vaporized by the chiller coil, and
   iv) the heat exchanger coil is positioned within a headspace of the second intermediate fluid storage tank.

5. The system of claim 4 wherein the system may be reconfigured so that:
   v) the chilling reservoir is configured to receive and vaporize intermediate fluid liquid from second intermediate fluid storage tank using the chiller coil,
   vi) the first intermediate fluid storage tank is configured to receive the intermediate fluid vaporized by the chiller coil, and vii) the heat exchanger coil is positioned within a headspace of the second intermediate fluid storage tank.

6. The system of claim 4 further comprising a third intermediate fluid storage tank configured to contain a supply of intermediate fluid liquid and to selectively supply intermediate fluid liquid to the chilling reservoir.

7. The system of claim 1 wherein the at least one intermediate fluid tank includes a single tank containing the heat exchanger coil and the chiller coil.

8. The system of claim 1 wherein the at least one intermediate fluid tank includes a pressure building circuit configured to vaporize intermediate fluid liquid and direct it to the headspace.

9. The system of claim 1 further comprising a bypass line having an inlet in fluid communication with the bulk storage tank and an outlet in fluid communication with the buffer tank.

10. The system of claim 1 further comprising a heat exchanger configured to receive and to warm fluid from the heat exchanger coil and direct warmed fluid to the buffer tank.

11. The system of claim 1 further comprising a pump having an inlet in fluid communication with the bulk storage tank and an outlet in fluid communication with the heat exchanger coil so that cryogenic fluid from the bulk tank is provided to the heat exchanger coil when the pump is activated.

12. The system of claim 1 further comprising a compressor having an inlet in fluid communication with an outlet of the heat exchanger coil and an outlet in fluid communication with the buffer tank so that cryogenic fluid from the bulk storage tank is pulled through the heat exchanger coil and directed to the buffer tank when the compressor is activated.

13. A system for dispensing a cryogenic fluid comprising:
a. a bulk storage tank containing a supply of the cryogenic fluid;
b. at least one intermediate fluid tank containing an intermediate fluid liquid with a headspace defined there above containing an intermediate fluid vapor;
c. a heat exchanger coil positioned in the headspace of the at least one intermediate fluid tank and configured to receive and to warm a cryogenic fluid from the bulk storage tank via heat exchange with the intermediate fluid vapor in the headspace;
d. a buffer tank configured to receive fluid from the heat exchanger coil; and
e. a chiller coil submerged within the intermediate fluid liquid and configured to:
i) receive fluid from the buffer tank, and
ii) cool fluid received from the buffer tank via heat exchange with the intermediate fluid liquid within which the chiller coil is submerged, said chiller coil including an outlet configured to dispense fluid from the chiller coil.

14. The system of claim 13 wherein the intermediate fluid is carbon dioxide.

15. The system of claim 13 wherein the cryogenic fluid is hydrogen.

16. The system of claim 13 wherein the at least one intermediate fluid tank includes a first intermediate fluid storage tank, a second intermediate fluid storage tank and a chilling reservoir, wherein:
i) the chiller coil is positioned within the chilling reservoir,
ii) the chilling reservoir is configured to receive and vaporize intermediate fluid liquid from first intermediate fluid storage tank using the chiller coil,
iii) the second intermediate fluid storage tank is configured to receive the intermediate fluid vaporized by the chiller coil, and
iv) the heat exchanger coil is positioned within a headspace of the second intermediate fluid storage tank.

17. The system of claim 16 wherein the system may be reconfigured so that:
v) the chilling reservoir is configured to receive and vaporize intermediate fluid liquid from second intermediate fluid storage tank using the chiller coil,
vi) the first intermediate fluid storage tank is configured to receive the intermediate fluid vaporized by the chiller coil, and
vii) the heat exchanger coil is positioned within a headspace of the second intermediate fluid storage tank.

18. The system of claim 16 further comprising a third intermediate fluid storage tank containing a supply of intermediate fluid liquid, said third intermediate fluid storage tank configured to selectively supply intermediate fluid liquid to the chilling reservoir.

19. The system of claim 13 wherein the at least one intermediate fluid tank includes a single tank containing the heat exchanger coil and the chiller coil.

20. A method for dispensing a cryogenic fluid comprising the steps of:
a. storing the cryogenic fluid in a bulk storage tank;
b. storing an intermediate fluid in at least one intermediate fluid storage tank as an intermediate fluid liquid with an intermediate fluid vapor above;
c. warming cryogenic fluid from the bulk storage tank via heat exchange with the intermediate fluid vapor so that the intermediate fluid vapor is condensed;
d. storing the warmed fluid in a buffer tank;
e. cooling fluid from the buffer tank via heat exchange with the intermediate fluid liquid;
f. dispensing the cooled fluid.

21. The method of claim 20 wherein the intermediate fluid is carbon dioxide.

22. The method of claim 20 wherein the cryogenic fluid is hydrogen.

* * * * *